United States Patent [19]

Swain

[11] Patent Number: 5,630,196

[45] Date of Patent: May 13, 1997

[54] RECYCLABLE PHOTORECEPTOR END FLANGE

[75] Inventor: Eugene A. Swain, Webster, N.Y.

[73] Assignee: Xerox Corporation, Stamford, Conn.

[21] Appl. No.: 358,443

[22] Filed: Dec. 19, 1994

[51] Int. Cl.$^6$ .................................................. G03G 15/00
[52] U.S. Cl. ........................ 399/117; 29/895.22; 492/42
[58] Field of Search ............................... 355/200, 211; 492/42, 47, 18; 29/895.22; 215/211, 294, 214, 279, 282, 307; 220/323; 399/116, 117

[56] References Cited

U.S. PATENT DOCUMENTS

| | | | |
|---|---|---|---|
| 615,607 | 12/1898 | Broome | 215/279 |
| 2,200,758 | 5/1940 | Thaheld | 492/42 |
| 2,750,634 | 6/1956 | Stahlecker et al. . | |
| 4,156,958 | 6/1979 | Miesch . | |
| 4,527,883 | 7/1995 | Kamiyama | 355/211 |
| 4,561,763 | 12/1985 | Basch | 355/200 |
| 5,210,574 | 5/1993 | Kita | 355/211 |
| 5,316,129 | 5/1994 | Daily | 198/780 |
| 5,357,321 | 10/1994 | Stenzel et al. | 355/211 |
| 5,364,202 | 11/1994 | Ettelbrueck . | |
| 5,461,464 | 10/1995 | Swain | 355/211 |

FOREIGN PATENT DOCUMENTS 917271  1/1963  United Kingdom ............... 215/279

Primary Examiner—Robert Beatty

[57] ABSTRACT

A hollow cylinder supporting end flange including a disk shaped member having a circular periphery and a coil spring having a major plane substantially parallel to the major plane of the disk shaped member, an exposed arcuate outer periphery having a diameter larger than the inside diameter of the hollow cylinder, an outer exposed end and an inner end, the inner end comprising a section secured to the end flange and the exposed arcuate outer periphery of the coil spring being adjacent the circular periphery of the disk shaped member for engagement with a hollow cylindrical member upon insertion of the coil spring into the hollow cylindrical member. This end flange may be utilized as a component of an assembly including a hollow cylindrical electrostatographic imaging member having a circular cross section and an inner surface, and an end flange secured to at least one end of the hollow cylindrical member by a partially wound coil spring, the spring having an inner end and an outer end, the inner end being secured to the end flange and the outer end having an exposed arcuate outer surface in frictional contact with the inner surface of the hollow cylindrical member. A process for fabricating this assembly is also disclosed.

15 Claims, 4 Drawing Sheets

FIG. 1
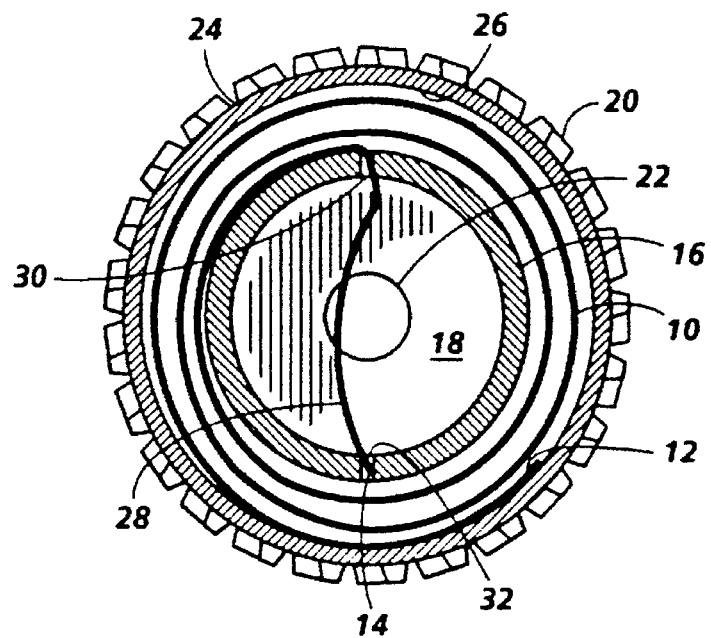
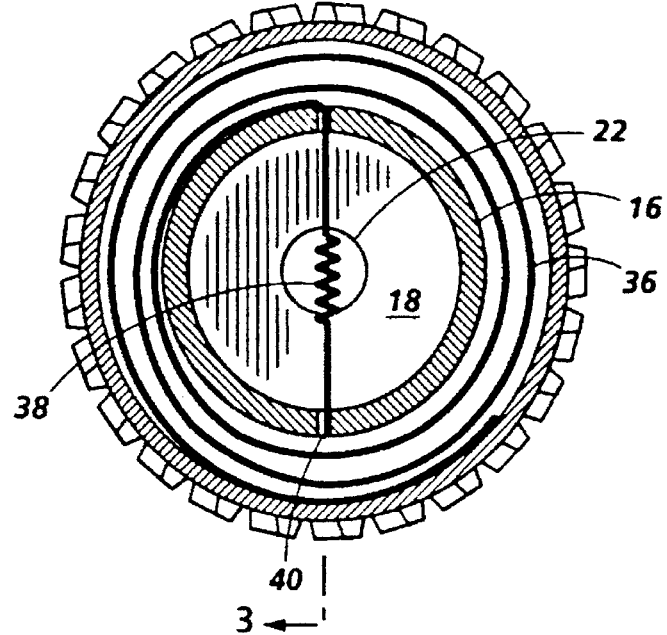
FIG. 2

FIG. 4
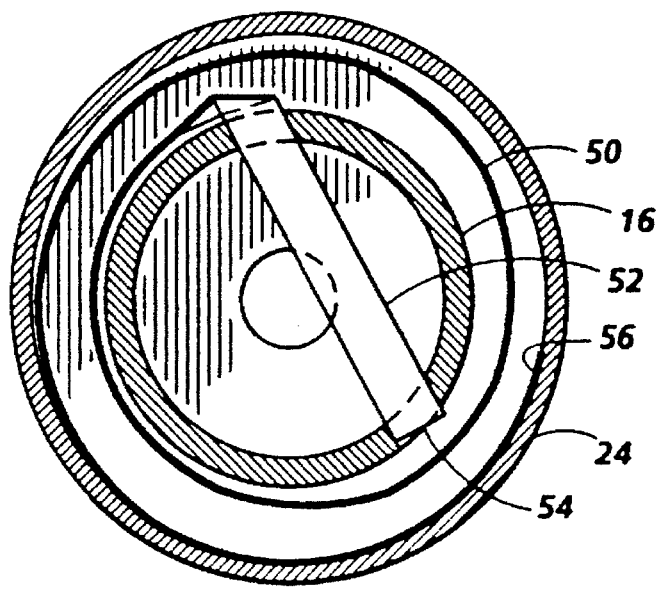
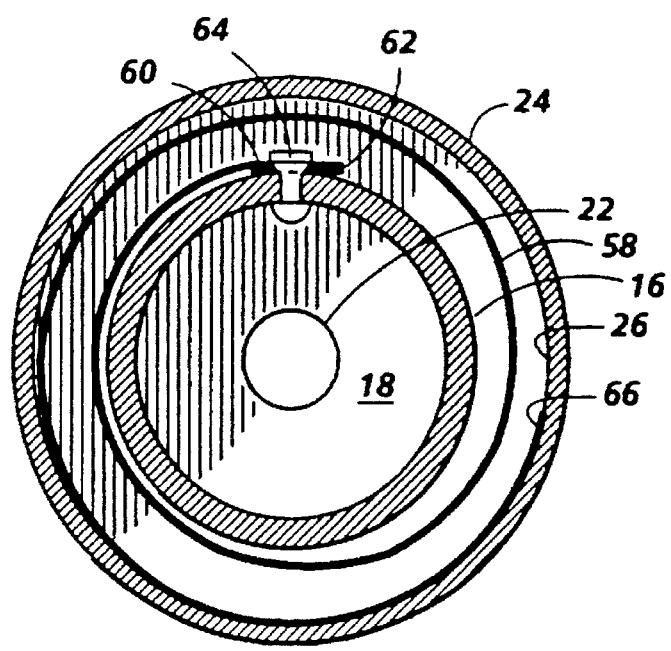
FIG. 5

FIG. 6
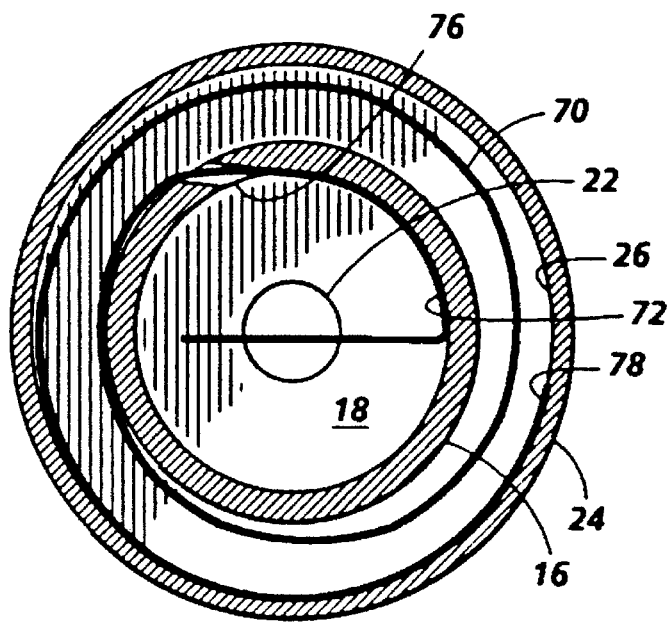
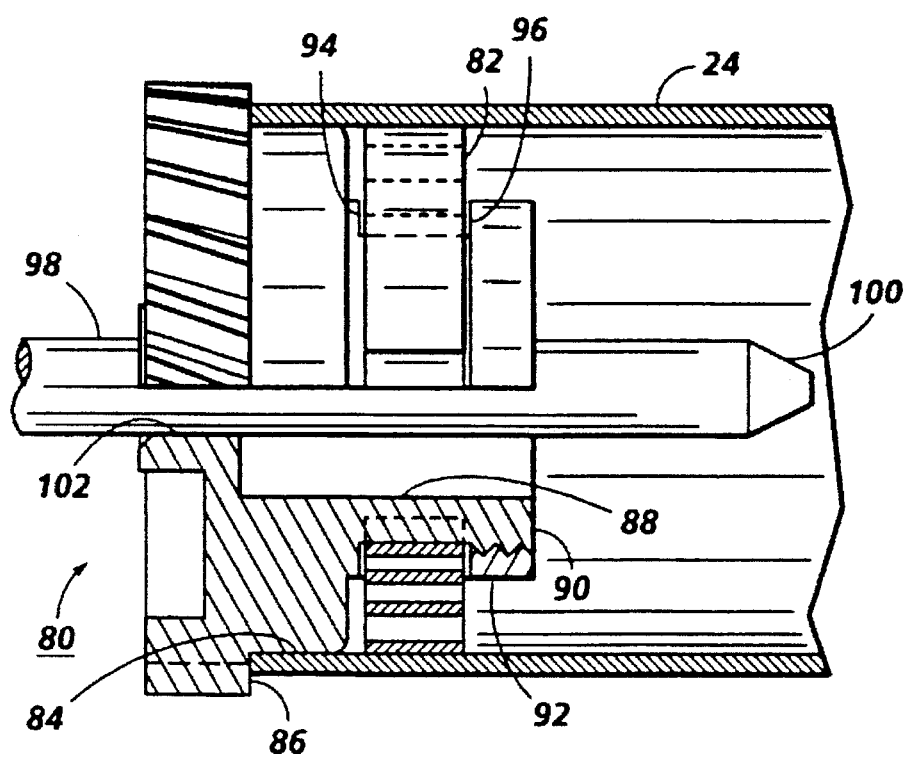
FIG. 7

RECYCLABLE PHOTORECEPTOR END FLANGE

BACKGROUND OF THE INVENTION

This invention relates in general to hollow cylindrical member support apparatus and more specifically to a hollow cylindrical member supporting end flange, a hollow cylindrical member assembly containing the end flange and methods for fabricating and using the hollow cylindrical member assembly.

A photoreceptor conventionally utilized for copiers and printers comprises a hollow electrically conductive drum substrate which has been dip coated with various coatings including at least one photoconductive coating comprising pigment particles dispersed in a film-forming binder. These drum type photoreceptors are usually supported on an electrically conductive shaft by drum supporting hubs or end flanges. The hubs are usually constructed of plastic material and have a hole through their center into which a supporting axle shaft is inserted. Since hubs are usually constructed of electrically insulating plastic material, an electrical grounding means comprising a flexible spring steel metal strip is secured to the hub and positioned to contact both the electrically conductive axle shaft and the electrically conductive metal substrate of the photoreceptor drum. One type of grounding means is illustrated in U.S. Pat. No. 4,561,763. This metal ground strip is often bent out of alignment when inserted into one end of a photoreceptor drum. Such misalignment can result in the metal strip not contacting the interior of the drum or the axle or both after insertion of the hub into the end of the drum is completed. Further, coatings electrically insulating in the dark that are formed on the surface of the interior of the drum during dip coating can adversely affect electrical grounding of the drum to the electrically conductive drum axle shaft. If inadequate electrical grounding of the drum to the axle shaft is detected after the drum has been inserted into a modular replacement unit in which photoreceptor and various other subsystems such as cleaning and charging units are permanently mounted, repair of the drum is usually impossible without destruction of the module.

Often the hub or end flange is secured to the end of the drum by a thermosetting resin adhesive. The use of an adhesive increases the number of steps and complexity of equipment required to assemble and disassemble a hub and cylindrical member assembly. Recycling of used drums having glued hubs is difficult, if not impossible, because of damage to the hub or the drum or both during removal of the hub from the drum by common techniques such as by hammering. Such removal techniques damage or destroy both the drum and the hub. Further, where disassembly is accomplished without damage, cleaning of both the hub and the cylindrical substrate is required to remove adhering adhesive. In addition, adhesive application equipment utilized during mounting of an end flange to a cylindrical substrate are difficult to maintain because the adhesive has a short pot life and often solidifies and clogs the equipment thereby requiring time consuming efforts to clean and remove the solidified adhesive. The use of bolts and nuts to secure hubs to drums requires time intensive activity and does not address the problem of electrically grounding a drum substrate to the drum axle shaft.

Another type of hub avoids the need for an adhesive by utilizing resilient fingers having pointed tips that dig into and penetrate the inner surface of the drum. This hub is described in U.S. Pat. No. 5,357,321, the entire disclosure thereof being incorporated herein by reference. The hub provides excellent support for the drum. However, the pointed tips can form scratches and grooves in the interior surface of the drum during installation, use and removal. These scratches or grooves can adversely affect recycling of the cylindrical substrate. For example, in processes for dip coating a hollow cylindrical substrate such as a drum, the substrate is immersed in a coating solution by vertically moving the substrate in a direction parallel to the axis of the substrate. To avoid coating the interior of the hollow substrate, an expandable mandrel is usually employed to grip and seal off the upper end of the drum during the immersion coating process. Sealing of the upper end of the cylindrical substrate traps air within the interior of the cylindrical substrate below the mandrel during the coating operation thereby preventing any significant entry and deposition of the coating material within the hollow interior of the cylindrical substrate during the dip coating operation. However, scratches or grooves in the upper end of the interior of the cylindrical substrate interferes with the establishment of an airtight seal thereby allowing air to leak out from the interior of the cylindrical substrate past the mandrel seal. This allows undesirable entry and deposition of the coating material within the interior of the cylindrical substrate during dip coating operations.

Thus, there is a continuing need for improved photoreceptors that are more reliable and facilitate recycling.

INFORMATION DISCLOSURE STATEMENT

U.S. Pat. No. 5,357,321 issued to Stenzel et al on Oct. 18, 1994—A drum supporting hub is disclosed comprising a disk shaped member having a circular periphery, a hole extending axially through the center of the disk shaped member, and at least one long thin electrically conductive resilient member secured to the disk shaped member, the resilient member having a central section adjacent the hole and having opposite ends, each of the ends terminating into at least one pointed tip adjacent the circular periphery of the disk shaped member, and the resilient member having a major plane substantially parallel to the axis of the disk shaped member. This hub may be inserted in at least one end of a cylindrical electrostatographic imaging member to produce an imaging member assembly.

U.S. Pat. No. 4,561,763 issued to D. Basch issued on Dec. 31, 1985 a drum supporting hub is disclosed having a tapered pot-like hub configuration comprising a bottom section and a rim, the rim comprising a plurality of circumferentially spaced resilient fingers extending at a slight incline outwardly from the axis of the pot-like hub away from the bottom section, at least three of the fingers having lips at the ends of the fingers, the lips projecting away from the axis for engagement with an end of a cylindrical drum upon insertion of the pot-like hub into the drum, the rim other than the lips having an outside diameter slightly larger than the outside diameter of the bottom. The drum supporting hub is employed in a drum assembly comprising the hub, a cylindrical drum having a circular cross-section and a shaft positioned along the axis of the drum. A metal shim is utilized to electrically ground the drum to the shaft.

SUMMARY OF THE INVENTION

It is, therefore, an object of the present invention to provide an improved end flange and hollow cylindrical member assembly which overcomes the above-noted disadvantages.

It is another object of this invention to provide an improved end flange and hollow cylindrical member assembly which achieve excellent electrical grounding of an electrostatographic substrate.

It is still another object of this invention to provide an improved end flange and hollow cylindrical member assembly which facilitate recycling of end flange and hollow cylindrical member.

It is yet another object of this invention to provide an improved end flange and hollow cylindrical member assembly which reduces the number of assembly steps utilized to manufacture the assembly.

It is another object of this invention to provide an improved end flange and hollow cylindrical member assembly which eliminates the need for gluing an end flange to the end of a hollow cylindrical member.

It is another object of this invention to provide an improved end flange and hollow cylindrical member assembly which quickly achieves excellent anchoring of the end flange to a hollow cylindrical member.

The foregoing and other objects of the present invention are accomplished by providing a hollow cylinder supporting end flange comprising a disk shaped member having a circular periphery and a coil spring having a major plane substantially parallel to the major plane of the disk shaped member, an exposed arcuate outer periphery having a diameter larger than the inside diameter of the hollow cylinder, an outer exposed end and an inner end, the inner end comprising a section secured to the end flange and the exposed arcuate outer periphery of the coil spring being adjacent the circular periphery of the disk shaped member for engagement with a hollow cylindrical member upon insertion of the coil spring into the hollow cylindrical member. This end flange may be utilized as a component of an assembly comprising a hollow cylindrical electrostatographic imaging member having a circular cross section and an inner surface, and an end flange secured to at least one end of the hollow cylindrical member by means of a partially wound coil spring, the spring having an inner end and an outer end, the inner end being secured to the end flange and the outer end having an exposed arcuate outer surface in frictional contact with the inner surface of the hollow cylindrical member. The assembly may be fabricated by providing a hollow cylindrical electrostatographic imaging member having an interior surface, a coated outer surface and two ends, providing a drum supporting end flange comprising a disk shaped member having a circular periphery, a hole extending axially through the center of the disk shaped member, and at least one coil spring secured to the disk shaped member, the coil spring having an exposed arcuate outer periphery and an outer diameter greater than the inside diameter of the hollow cylindrical electrostatographic imaging member, partially compressing the coil spring, inserting the coil spring into one of the ends of the hollow cylindrical electrostatographic imaging member and allowing the coil spring to unwind until the exposed arcuate outer periphery of the coil spring frictionally engages the interior surface to retain the end flange in an end of the hollow cylindrical electrostatographic imaging member.

BRIEF DESCRIPTION OF THE DRAWINGS

In general, the advantages of the improved drum supporting hub and drum assembly will become apparent upon consideration of the following disclosure of the invention, particularly when taken in conjunction with the accompanying drawings wherein:

FIG. 1 is a schematic cross sectional end view illustration of an end flange mounted in one end of a hollow cylindrical member of this invention.

FIG. 2 is a schematic cross sectional end view illustration of an end flange mounted in one end of a hollow cylindrical member of another embodiment of this invention.

FIG. 4 is a schematic cross sectional end view illustration of an end flange mounted in one end of a hollow cylindrical member of still another embodiment of this invention.

FIG. 5 is a schematic cross sectional end view illustration of an end flange mounted in one end of a hollow cylindrical member of another embodiment of this invention.

FIG. 6 is a schematic cross sectional end view illustration of an end flange mounted in one end of a hollow cylindrical member of still another embodiment of this invention.

FIG. 7 is a schematic cross sectional side view illustration of another end flange and hollow cylindrical member assembly embodiment of this invention.

Figure 3:
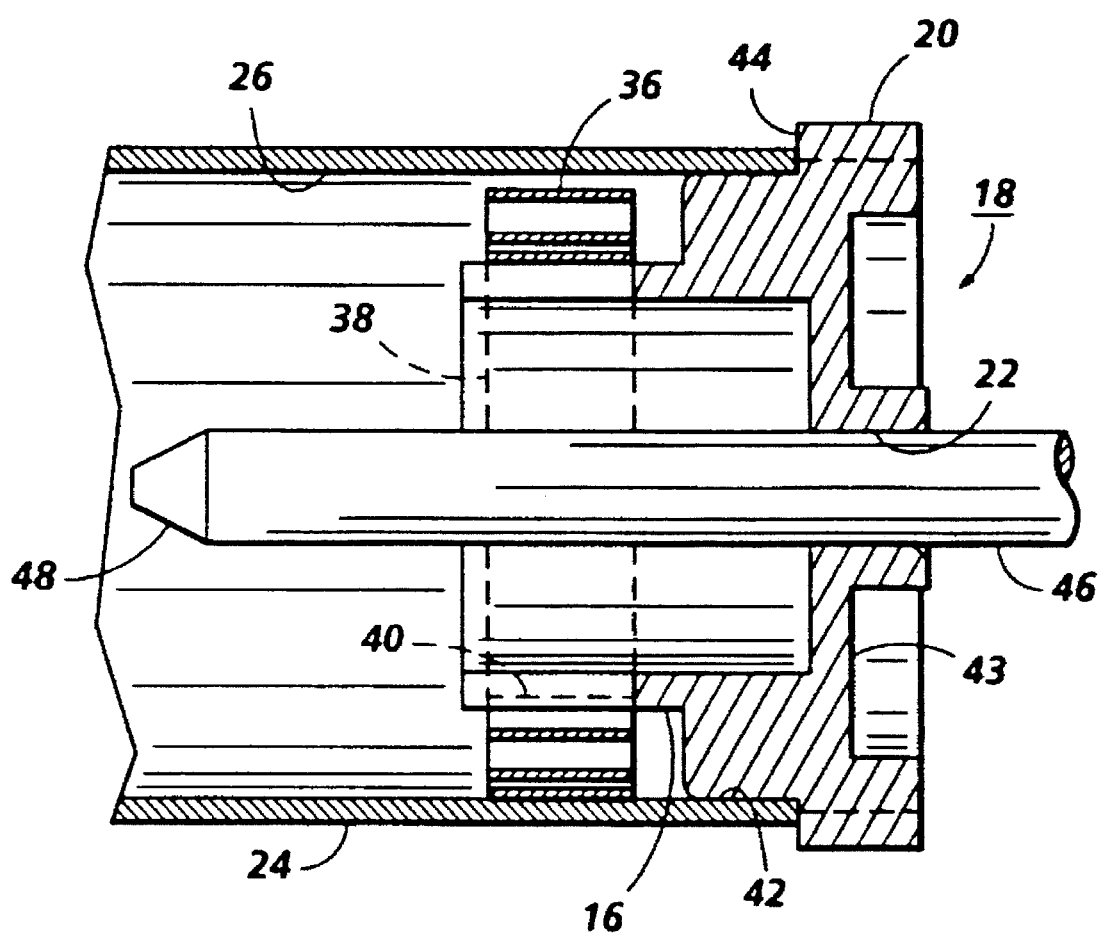
FIG. 3 is a schematic cross sectional side view illustration of the end flange and hollow cylindrical member assembly illustrated in FIG. 2.

These figures merely schematically illustrate the invention and are not intended to indicate relative size and dimensions of actual devices and components thereof.

DETAILED DESCRIPTION OF THE DRAWINGS

The present invention may be employed in any suitable device that requires support for a drum. However, for purposes of illustration, the invention will be described with reference to an electrostatographic imaging system. A typical electrophotographic imaging system is illustrated in U.S. Pat. No. 3,900,258 to R. F. Hoppner et al, the entire disclosure thereof being incorporated herein by reference.

Referring to FIG. 1, a partially wound resilient electrically conductive metal coil spring 10 is illustrated having an outer end 12 and an inner end 14. Coil spring 10 is coiled around a support hub 16 extending in an axis direction from an end flange 18 comprising a disk shaped member (not shown) which carries molded gear teeth 20 around the outer periphery thereof. The major plane of the disk shaped member and the major plane of the coil spring 10 are parallel to each other. The expression "major plane", as employed herein, is defined as a plane which extends through either the disk shaped member or the coil spring and which is perpendicular to the axis of either the disk shaped member or the coil spring and is the plane of expansion or contraction of the coil spring. The disk shaped member and the coil spring share a common axis. A hole 22 is located at the axis of end flange 18. Surrounding coil spring 10 is a hollow cylindrical member 24. The exposed arcuate outer surface of coil spring 10 is in partial frictional contact with the electrically conductive interior surface 26 of hollow cylindrical member 24. A section 28 of inner end 14 of coil spring 1 is bowed to facilitate insertion of an electrically conductive support shaft (not shown) through hole 22. The amount of bow is such that section 28 of inner end 14 of coil spring 10 will frictionally engage the support shaft to ensure a complete electrical path from the electrically conductive interior surface 26 to the electrically conductive support shaft. Support hub 16 has two slots 30 and 32 to accept section 28 of inner end 14 of coil spring 10. Slots 30 and 32 secure coil spring 10 to hub 16 and facilitate winding or unwinding of coil spring 10 when torque is applied to end flange 18 through gear teeth 20. Section 28 may fit loosely in slots 30 and 32 or may be molded into place so that there is visible no space between hub 16 and section 28. Although spring 10 is shown secured to support hub 16 by molding, adhesives and the like, spring 10 may be secured to end flange 18 by any other suitable means. For example, spring 10 may be bolted or otherwise screwed to hub 16 or other suitable projections extending toward the interior of a hollow cylindrical drum 24 from end flange 18. At least 350 degrees of arc of the exposed arcuate outer surface of coil spring 10 should contact and frictionally engage the electrically conductive interior surface 26 of hollow cylindrical member 24 when torque is applied to end flange 18 through gear teeth 20 in a direction which unwinds coil spring 10. This enables end flange 18 to drive hollow cylindrical member 2, without slippage between end flange 18 and cylindrical member 24. Any suitable material may be utilized for coil spring 10. Coil spring 10 should also be bendable, but resist permanent deformation. Thus, for example, a coil spring made of thin malleable aluminum foil will lack sufficient stiffness and will permanently deform when attempts are made to use the foil as a coiled spring. Preferably, coil spring 10 comprises a metal having hard, spring-like properties. Typical hard, spring-like metals include, for example, carbon spring steel, stainless steel, copper beryllium alloy, phosphorous bronze and the like or a conductive plastic. Resilient member 10 preferably has an electrical resistivity of less than about 1,000 ohm cm, but in some embodiments electrical conductivity is not needed since alternate grounding techniques can be employed. The specific material and length, width, and thickness selected affect the resiliency of coil spring 10. The width and thickness should be sufficient to resist permanent deformation and to retain end flange 18 in position at at least one end of hollow cylindrical member 24. Typical physical widths are, for example, between about 0.5 centimeter and about 5 centimeter and typical thicknesses are between about 0.05 millimeter and about 0.5 millimeter for a coil spring having a rectangular cross section. A typical stiffness of the coil spring ranges from between about 80 grams and about 1000 grams pull force to extend the spring from a coiled to uncoiled state for a 30 mm diameter cylindrical member but this depends upon the diameter of the cylindrical member in which it is to be inserted (e.g. the larger the diameter of the cylinder, the more stiffness required). The number of winds or coils in the coil spring 10 depends upon numerous factors such as, the thickness of the coils, stiffness of the spring, the width of the coil spring, and the diameter of the cylindrical member, and the like. A single spring coil having at least about 320 degrees of the exposed periphery available for contact with the inner surface 26 of hollow cylindrical member 24 may be sufficient for retention of end flange 18 and resistance to slippage if spring 10 is sufficiently stiff. Regardless of the number of coils in spring 10, at least about 320 degrees of the exposed periphery of the coil spring 10 should contact the the inside surface of hollow cylindrical member to avoid slippage and to prevent distortion of the shape of hollow cylindrical member 24, if the cylindrical member is thin. Generally numerous coils may be desirable where a relatively weak spring is utilized. The spring material should be self supporting and be disposed to uncoil when wound. Any suitable coiled or convoluted spring may be utilized. Typical coil springs include, for example, clock springs, mechanical motor springs such as used in windup toys and music boxes, and constant tension springs such as used in coiled tape measures, and the like. A preferred coil spring is commercially available from Tensator, Louisville, Ky.

The exposed outer peripheral surface of the coil spring 10 which contacts the inner surface of the hollow cylindrical member 24 may be smooth or rough. Surface friction between the interior surface of hollow cylindrical member 24 and the exposed exterior surface of the expanding coil spring 10 retains the end flange 18 in place at one end of hollow cylindrical member 24 and also prevents relative motion between the end flange 18 and hollow cylindrical member 24 when either the end flange 18 or hollow cylindrical member 24 is rotated around their common axis by an externally applied torque. Since the exposed exterior surface of the expanding coil spring 10 is preferably smooth, it does not damage the interior surface 26 of hollow cylindrical member 24 during installation of end flange 18, imaging cycling, or end flange removal operations. If desired, either the outer surface of coil spring 10, interior surface 26 of hollow cylindrical member 24 or both may be provided with a roughened texture or a rubber like coating to increase friction between the outer surface of the coil spring and the inner surface of the cylindrical substrate, particularly for high torque applications. However, an extremely rough surface that damages the inner surface of the hollow cylindrical member 24 is less desirable because it can scratch the inner surface of the hollow cylindrical member and reduce its value for recycling. Hollow cylindrical member 24 is preferably an electrostatographic imaging drum. As described above, numerous factors affect slippage. For example, slippage is affected by the coefficient of friction characteristics of the inner surface of the hollow cylindrical member and the exposed outer peripheral surface of the coil spring that is in contact with the inner surface of the hollow cylindrical member, the radius of the cylindrical member, the stiffness of the coil spring, the contact area between the outer exposed peripheral surface of the coil spring that is in contact with the inner surface of the hollow, cylindrical member, and the like. Electrostatographic imaging drums comprise a hollow cylindrical electrically conductive substrate and at least one electrostatographic layer. Electrostatographic layers are well known in the art and may comprise a dielectric layer for electrographic imaging or at least one electrophotographic imaging layer for electrophotographic imaging.

Any suitable end flange 18 may be utilized with the coil spring 10 of this invention. Flange 18 may comprise any suitable metal, plastic or combination of a metal and a plastic materials. Although more expensive, typical metals include, for example, steel, aluminum, copper, bronze, brass and the like. Typical plastic materials include thermosetting or thermoplastic resins which are dimensionally stable. These plastic members may be filled or unfilled. Any suitable conventional filling material may be utilized. Typical thermoplastic resins include, for example, acrylonitrile butadiene styrenes (ABS), polycarbonates, nylons, acrylics and the like. Typical thermosetting resins include, for example, alkyds, allylics, epoxies, phenolics, and the like. Plastic end flanges are preferred because they are easily molded and are less expensive. If desired, plastic end flanges may comprise electrically conductive components such as conductive filler particles of metal, carbon black or the like to impart electrical conductivity properties to the end flange.

When end flange 18 is mounted on one end of hollow cylindrical member 24, coil spring 10 is preferably partially wound prior to insertion of spring 10 into the interior of one end of cylindrical member 24. Partial compression may be accomplished by any suitable means such as winding spring 10 by hand. Upon insertion into the interior of one end of the cylindrical member 24, the partially wound coil spring 10 is allowed to unwind and expand thereby bringing the outer exposed surface of coil spring 10 into frictional engagement with the inner surface 26 of the cylindrical member. This frictional contact between coil spring 10 and the inner surface 26 of the hollow cylindrical member 24 is increased when rotational torque is applied to end flange 18, hollow cylindrical member 24 or both in a direction which promotes unwinding of coil spring 10. However, when rotational torque is applied to end flange 18, hollow cylindrical member 24 or both in a direction which causes coiling or winding of coil spring 10, friction between the exposed outer surface of coil spring 10 and the inner surface 26 of hollow cylindrical member 24 is reduced to the point where end flange 18 may easily be removed from hollow cylindrical member 24 without damage to the inner surface 26 of cylindrical member 24 or to the exposed outer surface of coil spring 10. Thus, when end flange 18 is to be removed, flange 18 is simply rotated in the non process direction and, at the same time, it is pulled out of the end of hollow cylindrical member 24. Instead of partial compression of coil spring 10 prior to insertion into one end of hollow cylindrical member 24, end flange 18 with coil spring 10 mounted thereto in a free and unconstrained state can be inserted into one end of cylindrical member 24 with a mere twisting motion of either end flange 10 or cylindrical member 24 or both in a direction which promotes winding of spring 10. Since the assembly of hollow cylindrical member 24, end flange 18 and coil spring 10 can be free of any adhesive, disassembly is rapid, simple and all the separated components remain undamaged throughout the disassembly process. This greatly facilitates recycling of the undamaged components. For example, inner surface 26 of hollow cylindrical member 24 remains free of scratches so that, following removal of any old coatings such as electrophotographic coatings, cylindrical member 24 may dip coated without encountering loss of an air seal between an expandable mandrel and the inner surface 26 of cylindrical member 24.

The resultant force of the outer exposed surface of coil spring 10 against inner surface 26 of hollow cylindrical member 24 differs markedly depending upon the direction of rotation of hollow cylindrical member 24 and/or end flange 18. Thus, the end flange of this invention will withstand slippage, relative to the hollow cylindrical member, when torque is applied in one direction and yet can be easily removable by application of torque in the opposite direction. Avoidance of slippage assures registration of electrostatographic images and enhances achievement of quality electrostatographic images. As described above, partial or complete compression of coil spring 10 is achieved by partially or completely winding coil spring 10 to decrease the diameter or outer circumference of the exposed outer peripheral surface of spring 10. Thus, such a partially or completely wound spring freed of any constraints will expand and unwind and become larger in diameter and larger in outer circumference until a free state is achieved. The expression "partially wound spring" as employed herein is defined as a condition between an unwound free state and a fully wound state. The diameter of coil spring in the free state should be sufficiently greater than the inside diameter of the hollow cylindrical member 24 to ensure sufficient frictional contact between at least the outer end 12 of spring 10 and the inner surface of hollow cylindrical member 24 so that spring 10 can be unwound by rotation in a suitable direction of end flange 18, cylindrical member 24 or both. However, the diameter of coil spring 18 in the free state should not be so much greater than the inside diameter of the hollow cylindrical member 24 that coil spring 10 in the fully wound state will not fit inside hollow cylindrical member 24. The fully wound state is reached when the spring cannot be wound any further. The exposed outer peripheral surface of a partially wound coil spring will expand when unwound in one direction and contract when wound in the opposite direction. Depending upon the direction of winding, the resultant force exerted by the exposed peripheral surface of the spring 10 against the inner surface 26 of cylindrical member 24 is markedly different. When spring 10 is unwound while positioned within the interior of hollow cylindrical member 24, the resultant force prevents slippage between spring 10 and inner surface 26 of cylindrical member 24. Since the inner end 14 of spring 10 is secured to end flange 18, relative movement between end flange 18 and cylindrical member 24 is also frozen when spring 10 in unwound. However, when partially wound spring 10 is wound, the resultant force is markedly reduced and slippage between the exposed exterior surface of spring 10 and inner surface 26 of hollow cylindrical member 24 readily occurs to facilitate removal of flange 18 from cylinder 24. Partial compression of coil spring 10 after installation, promotes retention of end flange 18 on one end of cylindrical member 24 due to frictional contact between the outer peripheral surface of coil spring 10 and the interior surface 26 of cylinder 24.

Generally, the combination of hollow cylindrical member 24, coil spring 10 and end flange 18 resists slippage when torque is applied to end flange 18 and/or cylindrical member 24. In one embodiment, torque is applied via hollow cylindrical member 24 to the coil spring 10 and end flange 18 combination by application of a rotational force to the opposite end of the hollow cylindrical member 24 (not shown). End flange 18 may be mounted on one end or both ends of cylindrical member 24. If mounted on opposite ends of hollow cylindrical member 24, the end flanges may have similar or different configurations. Other configurations of end flange 18 are described hereinbelow.

If desired, torque may be applied to end flange 18 by any suitable gear driven means (not shown) through gear teeth 20 which are shown in FIG. 1 as an integral part of the end flange 18. The gear driven means may be connected to a suitable power source as is conventional in the art. Such an arrangement is well known in the art and is illustrated, for example, in U.S. Pat. No. 3,900,258 to R. F. Hoppner et al, the entire disclosure thereof being incorporated herein by reference. However, a gear may be formed separately and merely attached to the flange by any suitable means such as bolts, rivets, adhesives and the like (not shown). Alternatively, torque may be applied to an end flange through a pulley (not shown) attached to the flange, the pulley being driven by a belt (not shown). In still an other embodiment, the end flange may be secured to a drive shaft (not shown) which is driven by any suitable conventional means such as a direct drive electric motor (not shown). Generally, when utilized to support and drive a hollow electrostatographic imaging member, the coil spring and end flange combination of this invention should withstand an applied torque of at least about 30 inch pounds (34.5 centimeter kilograms) on a 30 mm diameter cylindrical member without encountering slippage between the exposed outer peripheral surface of the coil spring and the inner surface of the hollow cylindrical imaging member. Where the hollow cylindrical member is driven by torque applied to a coil spring and end flange combination located at one end of the cylindrical member and an end flange at the opposite end of the drum is employed to drive numerous other components of an imaging system, the coil spring and end flange combination will be subjected to considerable torque. Also, resistance to cylinder rotation due to peripheral devices such as cleaning blades, brushes or webs in contact with the outer imaging surface of a cylindrical member may need to be considered when determining the amount of torque that must be overcome without slippage between the end flange and the cylinder.

Shown in FIG. 2, an end flange 18 that is similar to the end flange illustrated in FIG. 1 except for a variation in the configuration of the end of the coil spring. More specifically, coil spring 36 has a section 38 at inner end 40 which has a zigzag shape which can be readily deflected when an electrically conductive support shaft (not shown) is inserted through hole 22.

FIG. 3 illustrates a side view of end flange 18, coil spring 36 and hollow cylindrical member 24 viewed in the direction of arrows 2—2 shown in FIG. 2. As seen in this view end flange 18 has a rim 42 which assists in centering end flange 18 in the end of hollow cylindrical member 24 so that they are coaxial. End flange 18 comprises a disk shaped member 43 which carries molded gear teeth 20 around the outer periphery thereof. Rim 42 may be molded together with disk shaped member 43. If desired, rim 42 and hub 16 can be preformed (not shown) and thereafter fastened to disk shaped member 43 by any suitable means such as by an adhesive, screw or the like. Rim 42 ensures that end flange 18 is centered in the end of hollow cylindrical member 24. A slight press or resistance fit of rim 42 of flange 18 into the end of hollow cylindrical member 24 may be desirable to prevent easy pull off of end flange 18 and to ensure that end flange 18 is coaxial with cylindrical member 24. If desired, the side of rim 42 facing the interior surface of hollow cylindrical member 24 may be tapered, beveled or otherwise or inclined toward the drum centerline (not shown) to facilitate insertion of end flange 18 into one end of cylindrical member 24 and to promote a snug fit between end flange 18 and cylindrical member 24 Thus, for example, rim 42 may have a truncated cross section. Rim 42 may be a continuous rim or a plurality of rim segments. Alternatively, instead of using rim 42, a conventional recess (not shown) may be formed in disk shaped member 43 to accept the end of cylindrical member 24. A shoulder 44 is also provided to maintain the position end flange 18 relative to the end of hollow cylindrical member 24. Any suitable supporting shaft 46 may be utilized to support end flange 18. Support shaft 46 has a pointed end 48 to deflect section 38 at inner end 40 of coil spring 36 when shaft 46 is inserted through hole 22 end flange 18 into the interior of hollow cylindrical member 24. Instead of pointed end 48, shaft 46 may have ends of any other suitable shape. Typical shapes include, for example, pointed ends, rounded ends, flat ends, and the like. The shaft may comprise any suitable material including, for example, metals such as steel, stainless steel, and the like; polymers such as polyesters, polycarbonates, polyamides, and the like; of reinforced polymers such as glass fiber and graphite fiber reinforced plastics, and the like. Generally, a pointed end 48 is preferred for embodiments where an end of a coil spring intended for frictional contact with the shaft would normally block progress of a shaft having a flat end during insertion of the shaft through an end flange. The pointed end 48 of shaft 46 deflects the end of the spring to facilitate insertion of the shaft into the end flange and simultaneously ensures that the spring end is biased against the shaft for good electrical contact for embodiments where the shaft is electrically conducting and the flange is electrically insulating. End flange 18 may be secured to shaft 46 by any suitable and conventional means (not shown) such as a set screw, key and slot combination, pins, and the like. Alternatively, end flange 18 may be driven directly by hexagonal or square support shafts (not shown) which mate with correspondingly shaped openings (not shown) in end flange 18. The support shaft can be driven directly by an electric motor (not shown) or by any other suitable power source as is well known in the art. Alternatively, end flange 18 may freely rotate on the support shaft. End flange 18 preferably has a circular periphery and a centered hole 22. However, instead of a support shaft which extends through the entire length of the hollow cylindrical member the end flange may have a molded support shaft stub (not shown) which extends away from the hollow cylindrical member. This latter embodiment preferably utilizes an electrically conductive end flange.

Referring to FIG. 4, a partially wound resilient electrically conductive metal coil spring 50 is shown in which section 52 at inner end 54 is skewed or slanted relative to the axis of hollow cylindrical member 24 and support hub 16 to facilitate insertion of a support shaft (not shown). Thus, in this embodiment, a shaft with a flat end may be employed rather than a shaft with a pointed or rounded end. Section 52 at inner end 40 is retained on support hub 54 by correspondingly skewed slots (not shown). The outer end 56 of coil spring 50 is shown contacting the interior surface 26 of hollow cylindrical member 24. At least 350 degrees of arc of the exposed arcuate outer surface of coil spring 50 preferably contacts and frictionally engage the electrically conductive interior surface 26 of hollow cylindrical member 24 when torque is applied in a direction which unwinds coil spring 50 to prevent slippage under operating conditions.

Shown in FIG. 5, a partially wound resilient coil spring 58 is shown in which section 60 at inner end 62 is fastened to supporting hub 16 by rivet 64 to secure coil spring 58 to hub 16 and facilitate winding or unwinding of coil spring 58. The outer end 66 of coil spring 58 is shown contacting the interior surface 26 of hollow cylindrical member 24. Because end flange 18 illustrated in FIG. 5 comprises electrically conductive material that provides an electrical path between interior surface 26 of hollow cylindrical member 24 and an electrically conductive support shaft (not shown) extending though hole 22, coil spring 58 need not be electrically grounded to the electrically conductive shaft.

Illustrated in FIG. 6, a partially wound resilient electrically conductive coil spring 70 is shown in which section 72 at inner end 74 conforms to part of the inner surface of support hub 16 and extends across hole 22. Section 72 at inner end 40 is retained on support hub 16 by slanted slot 76. Spring 72 may be molded in place in slanted slot 76 or glued thereto. The outer end 78 of coil spring 70 is shown contacting the interior surface 26 of hollow cylindrical member 24. At least 350 degrees of arc of the exposed arcuate outer surface of coil spring 70 will contact and frictionally engage the electrically conductive interior surface 26 of hollow cylindrical member 24 when torque is applied in a direction which unwinds coil spring 70 to prevent slippage under operating conditions.

FIG. 7 shows a side view of end flange 80, coil spring 82 and hollow cylindrical member 24. As seen in this view end flange 80 has a rim 84 which assists in centering end flange 80 in the end of hollow cylindrical member 24 so that they are coaxial. A shoulder 86 is also provided to maintain the position of end flange 80 relative to the end of hollow cylindrical member 24. Hub 88 of end flange 80 supports coil spring 82. The terminal end 90 of hub 88 is threaded to receive threaded collar 92. Shoulder 94 of hub 80 and the face 96 of threaded collar 92 form the walls of a channel which provide support to the sides of coil spring 82. This is desirable where coil spring 82 is weak and has a tendency to lean and form a cone shape rather than to maintain a disk shape when the sides of the spring are unsupported. Springs having a square, round or oval cross section (not shown) have a greater tendency to lean and form a cone shape than springs having a rectangular cross section. However, very stiff springs having a square, round or oval cross section exhibit a high resistance to forming a cone shape and may be used without supplemental side supports. Support shaft 98 has a pointed end 100 to deflect a section adjacent the inner end (not shown) of coil spring 82 when shaft 98 is inserted through hole 102 of end flange 80 into the interior of hollow cylindrical member 24.

If desired, a plurality of adjacent springs (not shown) sharing a common axis may be utilized with the end flange. However, the use of a plurality of springs tends to increase the cost and complexity of the end flange assembly.

The invention has been described in detail with particular reference to preferred embodiments thereof but it will be understood that variations and modifications can be effected within the spirit and scope of the invention as described herein above and as defined in the appended claims.

What is claimed is:

1. An end flange for supporting a hollow cylinder having an inside diameter, said end flange comprising
   a disk-shaped member having
      a circular periphery,
      an axis and
      a major plane perpendicular to said axis and
   a helical coil spring having
      a major plane substantially parallel to said major plane of said disk shaped member,
      an exposed arcuate outer periphery having a diameter larger than said inside diameter of said hollow cylinder,
      an outer exposed end and
      an inner end comprising a section secured to said end flange,
   said coil of said spring spiraling within said major plane toward said axis from said outer exposed end to said inner end and said exposed arcuate outer periphery of said coil spring being adjacent said circular periphery of said disk shaped member for engagement with a hollow cylindrical member upon winding, insertion, and expansion of said coil spring in said hollow cylindrical member.

2. An end flange according to claim 1 wherein said disk shaped member has a hole located at said axis of said disk shaped member and said inner end of said coil spring comprises a section adapted to engage in frictional contact with an axle inserted through said hole.

3. An end flange according to claim 1 wherein at least an edge of a section of said inner end of said coil spring facing said disk shaped member is inclined in a direction away from said axis of said disk shaped member to ensure deflection to one side upon contact with said end of said axle as said axle is inserted through said hole.

4. An end flange according to claim 1 wherein said coil spring has a rectangular cross section.

5. An end flange according to claim 4 wherein said coil spring has a smooth outer surface.

6. An end flange according to claim 5 wherein at east about 320 degrees of arc of said smooth outer surface of said coil spring is adapted to frictionally engage said hollow cylinder.

7. An end flange according to claim 5 wherein at least about 350 degrees of arc of said smooth outer surface of said coil spring is adapted to frictionally engage said hollow cylinder.

8. An end flange according to claim 1 wherein said disk shaped member comprises an annular outer member having a centrally located hole into which a bearing member has been mounted, said coil spring being carried by said bearing member.

9. An end flange according to claim 1 wherein said disk shaped member includes an outer rim to center said end on one end of said hollow cylindrical member.

10. An end flange according to claim 1 wherein said hollow cylindrical member is an electrostatographic imaging member.

11. An assembly comprising
    a hollow cylindrical electrostatographic imaging member having
       a circular cross section,
       an inner surface and
       an axis,
    an end flange secured to at least one end of said hollow cylindrical member, said end flange comprising a disk shaped member having
       a circular periphery,
       an axis coaxial with said axis of said imaging member and
       a major plane perpendicular to said axis, and
    a partially wound helical coil spring securing said end flange to said imaging member, said spring having
       a major plane substantially parallel to said major plane of said disk shaped member,
       an exposed arcuate outer periphery,
       an outer exposed end and
       an inner end secured to said end flange,
    said coil of said spring spiraling within said major plane toward said axis of said end flange from said outer exposed end to said inner end, and said exposed arcuate outer periphery of said coil spring being adjacent said circular periphery of said disk shaped member and in frictional engagement with said inner surface of said hollow cylindrical electrostatographic member.

12. An assembly according to claim 11 comprising a shaft extending along the axis of said hollow cylindrical electrostatographic imaging member, a first cylinder supporting end flange on said shaft at one end of said cylinder and a second cylinder supporting flange on said shaft at the other end of said cylinder, at least said first cylinder supporting flange having a hub extending into the interior of said cylinder, said hub supporting said partially wound helical coil spring having said exposed arcuate outer periphery in frictional contact with said inner surface of said hollow cylinder.

13. A process for fabricating an electrostatographic imaging member assembly comprising
    providing a hollow cylindrical electrostatographic imaging member having
       a circular cross section,
       an inner surface,
       a coated outer surface,
       two ends and
       an axis,
    providing a drum supporting end flange comprising a disk shaped member having
       a circular periphery,
       an axis coaxial with said axis of said cylinder,
       a hole extending axially through the center of said disk shaped member and
       a major plane perpendicular to said axis,
    providing a helical coil spring having
       a major plane substantially parallel to said major plane of said disk shaped member,
       an exposed arcuate outer periphery having a diameter larger than the inside diameter of said hollow cylindrical electrostatographic imaging member,
       an outer exposed end and
       an inner end secured to said end flange,
    said coil of said spring spiraling within said major plane toward said axis of said end flange from said outer exposed end to said inner end, and said exposed arcuate outer periphery of said coil spring being adjacent said circular periphery of said disk shaped member, partially compressing said coil spring, inserting said coil spring into one of said ends of said hollow cylindrical electrostatographic imaging member, and allowing said coil spring to unwind until said exposed arcuate outer periphery of said coil spring frictionally engages said interior surface to retain said end flange in an end of said hollow cylindrical electrostatographic imaging member.

14. A process according to claim 13 wherein at least about 320 degrees of arc of said exposed arcuate outer periphery of said coil spring frictionally engages said interior surface of said hollow cylindrical electrostatographic imaging member.

15. A process according to claim 13 wherein at least about 350 degrees of arc of said exposed arcuate outer periphery of said coil spring frictionally engages said interior surface of said hollow cylindrical electrostatographic imaging member.

* * * * *